UNITED STATES PATENT OFFICE.

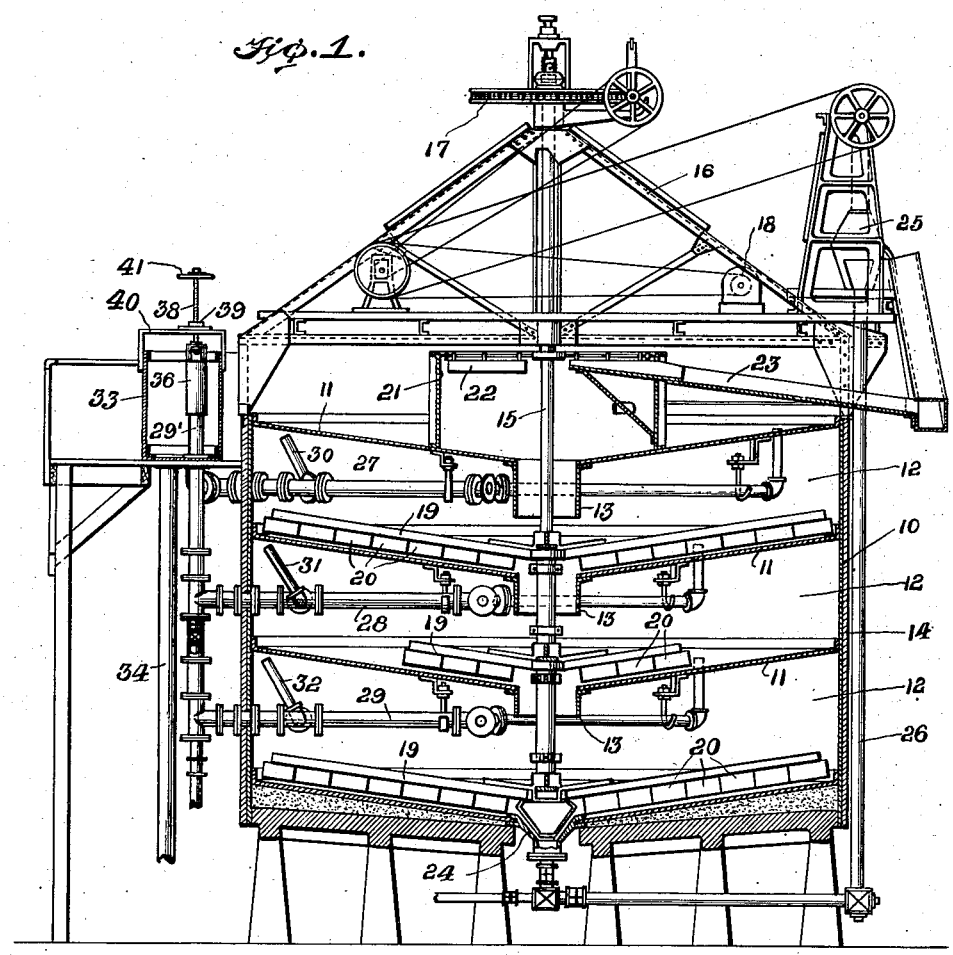

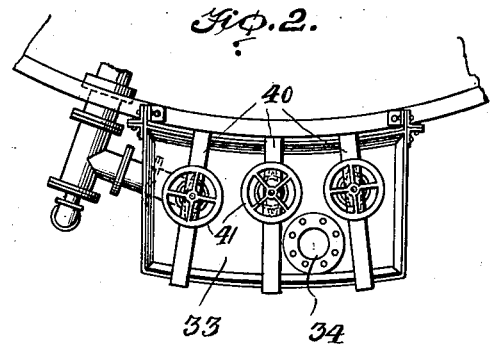
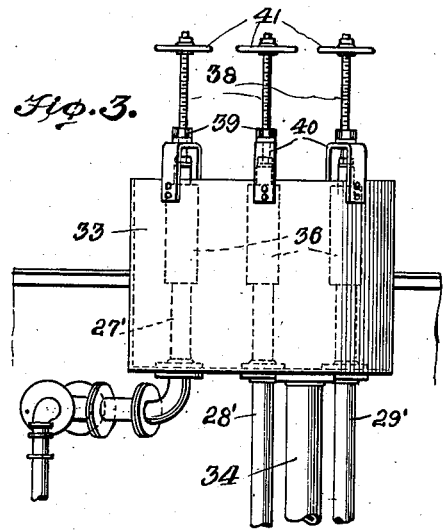
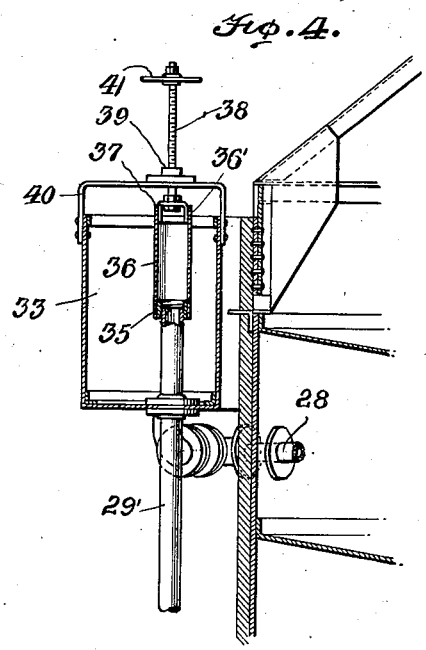
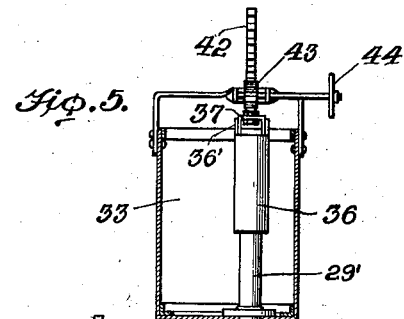
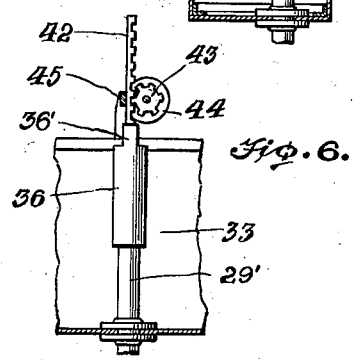

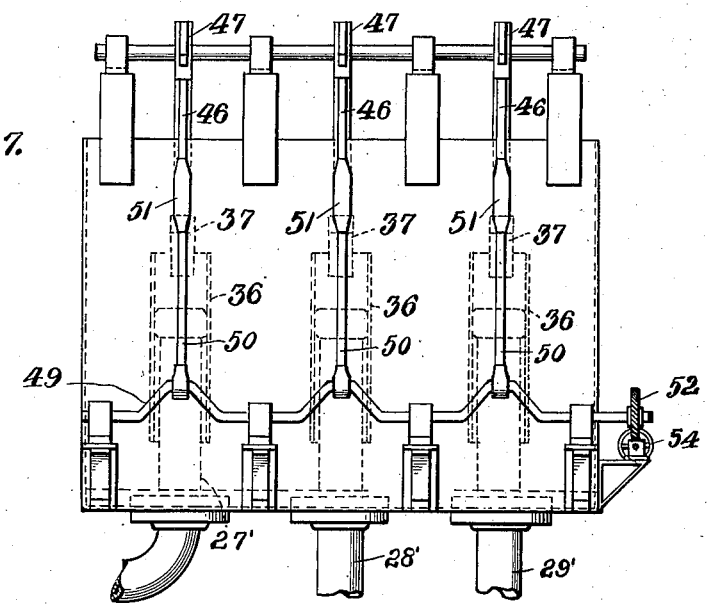
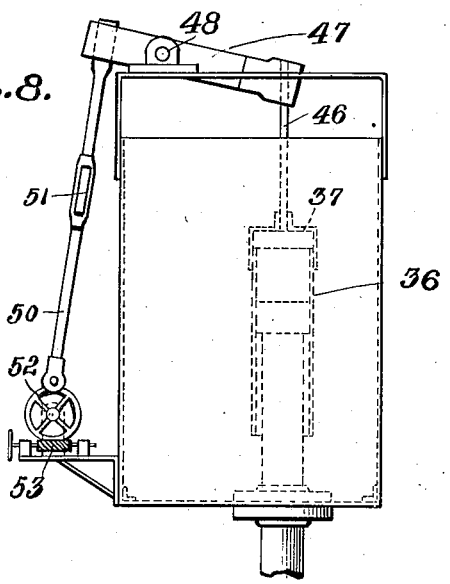

JAMES VINCENT SLADE, OF NEW YORK, N. Y., ASSIGNOR TO THE DORR COMPANY, A CORPORATION OF DELAWARE.

GRAVITATIONAL SEPARATOR.

1,405,022.   Specification of Letters Patent.   Patented Jan. 31, 1922.

Application filed July 31, 1920. Serial No. 400,412.

*To all whom it may concern:*

Be it known that I, JAMES VINCENT SLADE, a citizen of the United States, residing at New York, in the county of New York, State of New York, have invented certain new and useful Improvements in Gravitational Separators; and I do hereby declare the following to be a full, clear, and exact description of the invention, such as will enable others skilled in the art to which it appertains to make and use the same.

This invention relates to gravitational separators or thickeners and has for its object the provision of certain improvements in such apparatus.

Gravitational separators or thickeners are of wide application in many industries where it is desirable or necessary to separate slimes, sludge, or solid matter in general, from a liquid containing the same. In its usual form, the gravitational separator consists of a sedimentation or decantation compartment adapted to contain the liquid under treatment and provided with means for appropriately decanting substantially clear liquor from near the top of the compartment and with means for working settled solid matter towards a solids discharge outlet in the bottom of the compartment. In practice, it is customary to continuously supply the raw or untreated liquid to the sedimentation and decantation compartment and to continuously decant the substantially clear liquor from near the top of the compartment and to continuously discharge a thickened product containing a relatively high proportion of solid matter from the bottom of the compartment. Frequently, a plurality of superposed sedimentation and decantation compartments are embodied in a single structure, in which case it is the usual practice to provide independent agencies for permitting the flow of substantially clear liquor from near the top of each compartment. The settled solid matter may be independently discharged from the bottom of each compartment, or the superposed compartments may have a common solids-discharge path and outlet, in which event the combined solid matter from all of the compartments may be discharged through an appropriate outlet in the bottom of the lowermost compartment.

The rate of decantation, that is to say, the rate of the flow of substantially clear liquor from near the top of the sedimentation and decantation compartment of a gravitational separator, is determined by the hydrostatic head provided by the difference in level of the liquid in the compartment and of the discharge end of the outlet for the decanted liquor. The rate of decantation can be appropriately regulated by varying either the level or height of the liquid in the compartment or the level or height of the discharge end of the outlet for the decanted liquor. In a separator comprising a plurality of superposed and communicating compartments the regulation of the rate of decantation is important if satisfactory results are to be secured, and it is therefore customary to provide independent agencies in connection with each compartment for regulating the flow of decanted liquor therefrom. Such regulating agencies have heretofore taken the form of a vertical stand-pipe communicating with the sedimentation and decantation compartment near the top thereof and arranged to have its discharge end raised or lowered by manually putting on or taking off an appropriate number of superposed rings which are held in place by appropriate guides projecting from the natural upper or discharge end of the standpipe. Where hot or corrosive liquids are under treatment, this simple method of regulating the flow of decanted liquor from the sedimentation and decantation compartments becomes difficult and awkward, and the improvements of the present invention will be found of especial advantage in the treatment of liquids of this character in gravitational separators, more particularly of the tray or superposed compartment type.

In accordance with the present invention the liquid outlet or outlets of the gravitational separator are provided with mechanically operable adjusting means for adjusting the effective level or height of the discharge end of each liquid outlet and for thereby regulating the flow of decanted liquor from each compartment. Thus, the liquid outlet may include a vertical standpipe whose upper or natural discharge end is lower than the normal level of the liquid in the separator, and a mechanically operable adjusting member may be associated with the upper end of the standpipe for adjusting the height of the effective discharge end of the liquid outlet. The liquid outlets of the superposed compartments of a tray separator are capable of independent adjustment, and where desired means may be provided for simultaneously and similarly adjusting the effective discharge ends of all of the liquid outlets of the tray separator.

The novel features of the invention which I believe to be patentable are definitely set forth in the appended claims. These features, together with the construction and mode of operation of apparatus embodying the same, will be understood from the following description, taken in conjunction with the accompanying drawings, in which:

Fig. 1 is a sectional elevation of a gravitational separator of the tray type embodying the present invention;

Figs. 2, 3 and 4 are detail views illustrating the mechanically operable adjusting means for the liquid outlets of the superposed compartments of the separator shown in Fig. 1;

Figs. 5 and 6 are detail views of a modified mechanical construction of the adjusting means; and Figs. 7 and 8 illustrate a construction by which the effective discharge height of all of the liquid outlets of a tray separator may be simultaneously and similarly adjusted.

The gravitational separator or thickener illustrated in Fig. 1 of the drawings is of the tray or superposed compartment type and comprises a cylindrical tank 10 which is divided by a plurality of superposed trays or partitions 11 into a number of superposed sedimentation and decantation compartments 12. The trays 11 are secured at their outer periphery to the cylindrical side wall of the tank 10, and at their centers have registering openings from which depend boots 13. Where the separator is employed for the treatment of hot liquids, the outer and exposed surfaces of the tank 10 may be covered with a layer of heat insulating material 14.

The trays 11 are preferably inclined and slope from their outer peripheries towards the openings at the centers thereof. The depending boots 13 are in alinement and form in effect a solids-discharge path, common to the three settling compartments 12.

A revolving sludge-collecting mechanism is operatively mounted within the tank 10. This mechanism comprises a vertically disposed shaft 15 rotatably carried in appropriate over-head bearings secured to the super-structure 16. The shaft 15 is slowly rotated in any appropriate manner, as, for example, by a worm gear 17, driven from a motor 18 through appropriate instrumentalities. The shaft 15 extends downwardly through the boots 13. Three pairs of radially disposed arms 19 are appropriately secured to the shaft 15 and are arranged to revolve in proximity to the upper surfaces of the trays forming the bottoms of the compartments 12. Each of the radially disposed arms carries a series of plows or scrapers 20 which are arranged to move settled solid material from the periphery of the settling compartments towards the central solids-discharge outlets thereof.

A cylindrical drum 21, considerably smaller in diameter than the tank 10, is secured above the top tray 11 and provides a loading well into which the liquid to be treated is fed. One or more skimming arms 22 may, if desired, be secured to the shaft 15 near the top of the drum 21 and serve to direct any material floating on top of the liquid in the drum 21 into an appropriate discharge launder 23. In the construction illustrated in Fig. 1, the skimming arms are pivoted or hinged to horizontal rods radiating from the shaft 15, by which construction the skimming arms readily turn on their pivots or hinges in passing over the inner end of the launder 23.

The bottom of the tank 10 is provided with a discharge cone 24 for the discharge of the combined solid matter from all of the superposed settling compartments 12. The discharge of solid matter through the cone 24 is preferably effected by a diaphragm pump 25 which is connected to the cone 24 through a solids-discharge pipe 26. The pump 25 is of the uniform or constant displacement type, that is to say, at each stroke it removes a fixed predetermined volume of sludge or thickened product from the separator. The ultimate density of this thickened product will generally be such that the ratio of solids to liquid in the product will be of the approximate order of one to one. By appropriate adjustment, the pump is operated in such a manner that the volume of thickened product of the ultimate density withdrawn from the separator in a given interval of time contains substantially the same average amount of solids as is contained in the volume of mixed solids and liquor supplied to the separator in the same time interval. When thus properly adjusted, the constant displacement pump acts in the nature of a regulator, thereby insuring the proper functioning of the gravitational separator as a sedimentation and decantation apparatus.

Substantially clear liquor is decanted or withdrawn from the upper part of each of the three settling compartments 12 of the separator by means of decanting pipes 27, 28 and 29. The decanting pipes extend through the cylindrical side wall of the tank 10 and within the tank are substantially Y-shaped and have vertically positioned decanting connections 30, 31, and 32, respectively. The upper open ends of the decanting connections 30, 31 and 32 are near the top of their respective settling compartments. These decanting connections are moreover arranged near the outer circumference of the settling compartments. The decanting connections are equally spaced about the outer circumferential portion of the settling compartments, and while I have shown in the accompanying drawings only three decanting connections, more or less may, if desired, be employed.

The decanting pipes 27, 28 and 29 are independently connected to standpipes 27', 28' and 29'. The standpipes 27', 28' and 29' extend into a sump 33 and terminate at a level below the normal liquid level in the separator. The sump 33 has a depending discharge pipe 34 communicating with the bottom thereof.

The upper or outlet end of each of the standpipes 27', 28' and 29' is equipped with a metal packing ring 35 which may conveniently be screw-threaded onto the standpipe, as illustrated in Fig. 4 of the drawings. Hollow cylindrical adjusting tubes 36 are fitted over the metal packing rings 35 and have an inside diameter approximately the same as the outside diameter of the packing rings, thereby forming an effective seal against the flow of liquid out of the lower end of the adjusting tubes.

The upper ends of the tubes 36 are open except for a small fraction of the circumference occupied by flanges 36'. These flanges are in fact a continuation of the cylindrical wall of the tube. A U-shaped bracket 37 is riveted, or otherwise appropriately secured, to the flanges 36'. A screw-threaded rod 38 is secured to each of the brackets 37 and operatively engages a stationary nut 39 mounted on a bracket 40. The brackets 40 may be riveted to, or otherwise appropriately secured to, the walls of the sump 33. Each of the rods 38 is provided with an operating wheel or handle 41. The rod 38 may be so secured to the bracket 37 as to permit free rotation of the rod without necessarily rotating or turning the tube 36.

In the modification illustrated in Figs. 5 and 6 of the drawings, a vertically disposed rack 42 is secured to the bracket 37. An appropriately supported pinion 43 operatively engages the rack 42 and is adapted to be turned by a hand wheel 44. The rack 42 may conveniently be supported between the pinion 43 and a spring member 45, the latter serving to maintain the rack in its adjusted position.

In the modification illustrated in Figs. 7 and 8 a vertically disposed rod 46 is secured to the bracket 37 of each of the adjusting tubes or sleeves 36. The upper end of each of the rods 46 is operatively secured to one end of a lever 47 pivotally mounted on a fulcrum shaft 48. The other or outer ends of the levers 47 are connected to a common crank shaft 49 by independent tie-rods 50.

Each of the tie-rods 50 includes a turnbuckle 51, by means of which the tubes 36 may be independently adjusted for separately regulating the overflow of liquor from each of the stand-pipes 27', 28' and 29'. The crank shaft 49 carries a worm wheel 52 meshing with a worm 53 whereby the crank shaft may be turned and appropriately adjusted by a hand wheel 54. It will be observed that the movement of the crank shaft 47 simultaneously and similarly adjusts each of the tubes 36.

The apparatus illustrated in the accompanying drawings is particularly adapted for the separation of solid matter from sugar juices. This type of apparatus has been illustrated merely for the purpose of explaining the principles of the invention, and I wish it to be understood that apparatus embodying the invention is adapted for use in any industry where the separation of solid matter from a liquid containing the same is to be accomplished. The operation of the apparatus illustrated in the accompanying drawings, as especially applied to the sugar industry, is substantially as follows. The sugar juice from which solid matter is to be separated is fed into the cylindrical loading well 21 at such a rate as to maintain the liquor level in the well slightly lower than the lower edge of the skimmers 22. Any foam which may form on the surface of the liquid in the well 21 is brushed into the launder 23 by the skimmers 22 and may be disposed of by combining it with the sludge discharged by the pump 25. The solids in suspension in the liquid in the various compartments 12 tend to settle out on the tray bottom, leaving clear liquor in the upper portions of the compartments. Due to the height of the liquid in the loading well 21, the clear liquor in the upper portion of each of the compartments 12 will tend to flow through the decanting pipes 27, 28, 29, through the stand-pipes 27', 28' and 29', respectively, and so overflow the upper edge of the adjusting tubes 36. The flow of clear liquor from any one of the three compartments 12 may be regulated and controlled, or entirely stopped, if desired, by appropriate manipulation of the hand wheels 41. For example, it may be that the liquor coming from the center compartment 12 is murky indicating that the flow through this compartment is greater than its settling rate. Under such circumstances, it is advisable to reduce the rate of flow through this compartment. This result may be accomplished by turning the appropriate hand wheel 41 so as to raise the cooperating tube 36 and thereby decrease the effective hydrostatic head of the intermediate compartment 12, whereupon the rate of flow through this compartment is reduced. It will be evident that by raising the adjusting tube 36 to a still further height, the flow of clear liquor from the intermediate compartment 12 may be entirely cut off.

The solid matter settling out on the bottoms of the compartments 12 is raked towards the center solids discharge outlets of the respective compartments by the slowly revolving rakes or plows 20 attached to the radial arms 19. The solids so raked or worked to the center of the upper tube compartments 12 fall through the boots 13 and mingle with the solids raked to the center of the bottom compartment 12. The combined solid matter from all of the three superposed compartments 12 are discharged through the cone 24 and are withdrawn from the tank through the pipe 26 by the pump 25, and may, if desired, be mixed with the floating solid matter discharged through the launder 23.

Prior to the present invention, means usually employed for controlling the flow of liquor from the superposed settling compartments of a tray separator or thickener comprise a multiplicity of rings, about one-quarter inch in thickness and of the same internal and external diameters as the decanting standpipes. These rings were loosely placed on the top of the standpipe and were held in place by three vertical guide rods secured to the outer periphery of the standpipe. In order to change the flow with such an arrangement, it is necessary to have a great number of these rings on hand and to place them on one another and to remove them by hand. In many instances, this arrangement has no particular disadvantages, but when treating corrosive liquids or hot liquids, as for example, in the manufacture of caustic soda, alumina, phosphoric acid, sugar, etc., it is difficult and sometimes dangerous for the operator to manipulate the rings. Thus, where the liquids under treatment are corrosive or hot, it is necessary to handle the rings by means of pliers or tongues, and this is an awkward, troublesome and time-consuming procedure.

By the improvements of the present invention, it is only necessary to turn the hand wheels 41 (or the hand wheels 44 or the turn buckle 51) in order to secure the desired regulation of the flow of clear liquor from the superposed settling compartments. Moreover, by the arrangement of the invention, a far more accurate and fine adjustment is possible than can be attained by the use of superposed rings. Moreover, by similarly and simultaneously regulating the effective height of the liquid outlets of all of the settling compartments appropriate adjustment may readily be made for any fluctuations in the level of the liquid in the tank 10. Such an adjustment is especially valuable where the supply or feed is not entirely constant or uniform, as for example, in the sugar industry.

I claim:

1. In a gravitational separator having a plurality of superposed sedimentation and decantation compartments, a liquid outlet communicating with each of said compartments near the top thereof for permitting the flow of liquid from each compartment, each of said liquid outlets including a vertical standpipe whose natural discharge end is lower than the effective operating liquid level in said separator, and a mechanically operable adjusting member associated with each of said standpipes and adapted by its adjustment to regulate the effective level of the discharge end of the standpipe.

2. In a gravitational separator having a plurality of superposed sedimentation and decantation compartments, a liquid outlet communicating with each of said compartments near the top thereof for permitting the flow of liquid from each compartment, mechanically operable adjusting means associated with each of said liquid outlets for regulating said flow of liquid from each of said compartments, and means whereby all of said adjusting means may be simultaneously and similarly adjusted for simultaneously regulating to the same extent the flow of liquid from each of said compartments.

3. In a gravitational separator having a plurality of superposed sedimentation and decantation compartments, a liquid outlet communicating with each of said compartments near the top thereof for permitting the flow of liquid from each compartment, each of said outlets including a vertical standpipe whose natural discharge end is lower than the effective operating liquid level in said separator, a vertically movable tube operatively associated with each of said standpipes and adapted by its adjustment to regulate the effective level of the discharge end of the standpipe, and means for independently adjusting each of said tubes.

4. In a gravitational separator having a plurality of superposed sedimentation and decantation compartments, a liquid outlet communicating with each of said compartments near the top thereof for permitting the flow of liquid from each compartment, each of said liquid outlets including a vertical standpipe whose natural discharge end is lower than the effective operating liquid level in said separator, a tube adapted to fit snugly over the discharge end of each of said standpipes, a packing between said tube and said standpipe adapted to cause liquid flowing through said standpipe to flow over the lip of the tube, and means for independently raising and lowering each of said tubes so as to raise or lower the counterhead of the liquid flow in said separator.

5. In a gravitational separator having a plurality of superposed sedimentation and decantation compartments, a vertical standpipe associated with each of said compartments, a tube adjustably mounted on the discharge end of each of said standpipes, and means for raising and lowering each of said tubes individually so as to vary the counterhead of the flow of liquid in each compartment.

6. In a gravitational separator having a plurality of superposed sedimentation and decantation compartments, a liquid outlet communicating with each of said compartments near the top thereof for permitting the flow of liquid from each compartment, each of said liquid outlets including a vertical standpipe whose natural discharge end is lower than the effective operating liquid level in said separator, a vertically movable tube operatively associated with each of said standpipes and adapted by its adjustment to regulate the effective level of the discharge end of the standpipe, means for individually adjusting each of said tubes and means whereby all of said tubes may be simultaneously and similarly adjusted.

In testimony whereof I affix my signature.

JAMES VINCENT SLADE.